United States Patent Office 3,126,399
Patented Mar. 24, 1964

3,126,399
17α-(LOWER ALKANOYL)OXY - 3 - HYDROXY - 6α-
METHYLPREGN-4-EN-20-ONES, ESTERS THEREOF, AND 6-DEHYDRO DERIVATIVES CORRESPONDING
Paul B. Soliman, Wilmette, Ill., assignor to G. D. Searle & Co., Chicago, Ill., a corporation of Delaware
No Drawing. Filed Jan. 16, 1962, Ser. No. 166,689
7 Claims. (Cl. 260—397.4)

The present invention is concerned with novel 3-hydroxy and 3-(lower alkanoyl)oxy 6-methyl steroids and, more particularly, with 17α-(lower alkanoyl)oxy-3-hydroxy-6α-methylpregn-4-en-20-ones, esters thereof and the 6-dehydro derivatives corresponding, which can be represented by the structural formula

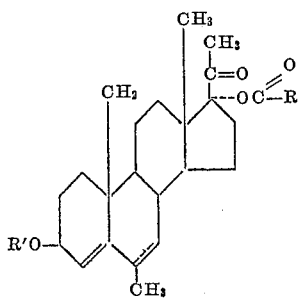

wherein R is a lower alkyl radical, R' can be hydrogen or a lower alkanoyl radical, and the dotted line indicates the optional presence of a double bond between carbon atoms 6 and 7.

Especially preferred embodiments of the present invention are the compounds represented by the structural formula

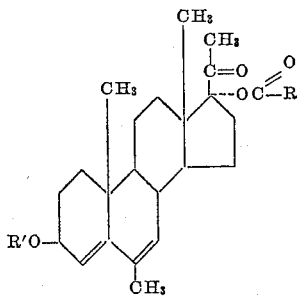

wherein R is a lower alkyl radical and R' can be hydrogen or a lower alkanoyl radical.

The lower alkyl radicals represented by the R term are exemplified by methyl, ethyl, propyl, butyl, pentyl, hexyl, and the branched-chain isomers thereof. The lower alkanoyl radicals encompassed by R' can be, typically, formyl, acetyl, propionyl, butyryl, valeryl, caproyl, and the branched-chain radicals isomeric therewith.

Starting materials suitable for the manufacture of the compounds of this invention are the 17α-(lower alkanoyl)-oxy-6α-methylpregn-4-ene-3,20-diones, described by Babcock et al., J.A.C.S., 80, 2904 (1958), and the corresponding 6-dehydro compounds, described in U.S. Patent 2,891,079. These 3-keto compounds are converted to the 3β-ols of this invention by reaction with a suitable reducing agent. Typical reagents are lithium tri-(tertiary-butoxy) aluminum hydride, lithium aluminum hydride, potassium borohydride, and sodium borohydride. The preferred reagent is lithium tri-(tertiary-butoxy) aluminum hydride in view of the fact that it affords the highest yield of the desired 3β-hydroxy compound. A specific example of this reduction process is the reaction of 17α-acetoxy-6-methylpregna-4,6-diene-3,20-dione with lithium tri-(tertiary-butoxy) aluminum hydride in tetrahydrofuran to afford 17α - acetoxy - 3β - hydroxy - 6 - methylpregna-4,6-dien-20-one.

Reaction of the instant 3β-ols with a suitable acylating agent produces the 3β-(lower alkanoates) of this invention. Typically, the aforementioned 17α-acetoxy-3β-hydroxy-6-methylpregna-4,6-dien-20-one is allowed to react with acetic anhydride in pyridine, resulting in 3β,17α-diacetoxy-6-methylpregna-4,6-dien-20-one.

The compounds of this invention display valuable pharmacological properties. They are, for example, potent progestational agents as is evidenced by their ability to induce proliferation of the endometrial gland.

The following examples are given by way of illustration only and are not to be construed as limiting the invention either in spirit or in scope. Temperatures are given in degrees centigrade (° C.) and quantities of materials in parts by weight unless otherwise noted.

Example 1

To an ice-cold solution of 45 parts of lithium tri-(tertiary-butoxy) aluminum hydride in 533 parts of tetrahydrofuran is added 15.4 parts of 17α-acetoxy-6α-methylpregn-4-ene-3,20-dione, and the resulting mixture is kept at 0° for about 2 hours, then is allowed to warm to room temperature over a period of about 2½ hours. This reaction mixture is then treated with 90 parts by volume of 10% aqueous sulfuric acid, and the liquid phase is decanted from the precipitated salts. Dilution of this solution with a solution of 150 parts of sodium chloride in 3,000 parts of water results in precipitation of the crude product, which is collected by filtration. Recrystallization first from benzene then from acetone-hexane affords pure 17α-acetoxy-3β-hydroxy-6α-methylpregn-4 - en - 20 - one, which melts at about 193–198°. It is further characterized by a specific rotation in chloroform of +41°.

Example 2

A mixture of 2.2 parts of 17α-acetoxy-3β-hydroxy-6α-methylpregn-4-en-20-one, 5.4 parts of acetic anhydride, and 4.9 parts of pyridine is stored at about 5° for about 16 hours, then is poured into water. The resulting precipitate is collected by filtration and recrystallized from acetone-hexane to yield pure 3β,17α-diacetoxy-6α-methylpregn-4-en-20-one. M.P. about 170–171°.

Example 3

To a solution of 30 parts of lithium tri-(tertiary-butoxy) aluminum hydride in 355 parts of tetrahydrofuran is added 11 parts of 17α-acetoxy-6-methylpregna-4,6-diene-3,20-dione, and the resulting solution is stored at room temperature for about 4 hours, then at 5° for about 40 hours. To this reaction mixture is then added 64 parts by volume of 10% aqueous sulfuric acid. The supernatant liquid phase is then separated by decantation and diluted with about 2500 parts of water. The precipitated crude product is collected by filtration, dried, then recrystallized from aqueous methanol to produce pure 17α-acetoxy-3β-hydroxy-6-methylpregna - 4,6 - dien - 20 - one, M.P. about 190–205°; $[\alpha]_D = -56.5°$. This compound is further characterized by an ultraviolet absorption maximum at about 241.5 millimicrons with a molecular extinction coefficient of about 25,000, and by additional ultraviolet maxima at about 234.5 and 250 millimicrons.

Example 4

A solution of 1.8 parts of 17α-acetoxy-3β-hydroxy-6-methylpregna-4,6-dien-20-one in 14.7 parts of pyridine and 16.2 parts of acetic anhydride is stored at room temperature for about 16 hours, then is diluted with water. The crude product which precipitates is collected by filtration, then is recrystallized from ethyl acetate-hexane to yield pure 3β-17α-diacetoxy-6-methylpregna-4,6-dien-20-one, which melts at about 197–199°. It displays a specific rotation in chloroform of −81°, and is further characterized by an ultraviolet absorption maximum at about 241.5 millimicrons with a molecular extinction coefficient of about 25,000, and also additional ultraviolet maxima at about 234.5 and 250 millimicrons.

*Example 5*

The substitution of 12.6 parts of 17α-hexanoyloxy-6-methylpregna-4,6-diene-3,20-dione in the procedure of Example 3 results in 17α-hexanoyloxy-3β-hydroxy-6-methylpregna-4,6-dien-20-one.

*Example 6*

The reaction of 2.06 parts of 17α-hexanoyloxy-3β-hydroxy-6-methylpregna-4,6-dien-20-one, 34 parts of hexanoic anhydride, and 14.7 parts of pyridine, according to the procedure of Example 4, results in 3β,17α-dihexanoyloxy-6-methylpregna-4,6-dien-20-one.

*Example 7*

The substitution of 17.6 parts of 17α-hexanoyloxyl-6α-methylpregn-4-ene-3,20-dione in the procedure of Example 1 results in 17α-hexanoyloxy-3β-hydroxy-6α-methyl-pregn-4-en-20-one.

*Example 8*

The reaction of 2.5 parts of 17α-hexanoyloxy-3β-hydroxy-6α-methylpregn-4-en-20-one, 11.3 parts of hexanoic anhydride, and 4.9 parts of pyridine, according to the procedure of Example 2, results in 3β-17α-dihexanoyloxy-6α-methylpregn-4-en-20-one.

*Example 9*

The substitution of 17.6 parts of 17α-hexanoyloxy-3α-hydroxy-6α-methylpregn-4-en-20-one in the procedure of Example 2 results in 3β-acetoxy-17α-hexanoyloxy-6α-methylpregn-4-en-20-one.

*Example 10*

By substituting 34 parts of hexanoic anhydride and otherwise proceeding according to the processes of Example 4, 17α-acetoxy-3β-hexanoyloxy-6-methylpregna-4,6-dien-20-one is obtained.

What is claimed is:
1. A compound of the structural formula

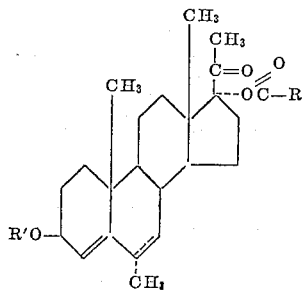

wherein R is a lower alkyl radical, R' is selected from the group consisting of hydrogen and lower alkanoyl radicals, and the dotted line indicates the optional presence of a double bond between carbon atoms 6 and 7.

2. A compound of the structural formula

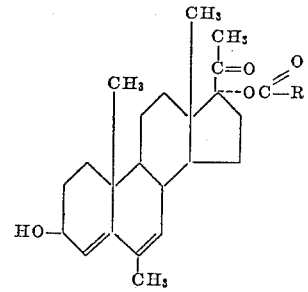

wherein R is a lower alkyl radical.

3. A compound of the structural formula

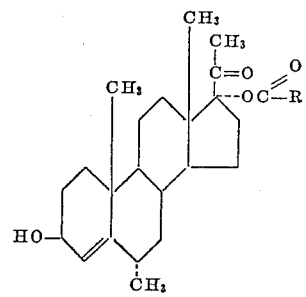

wherein R is a lower alkyl radical.

4. 17α-acetoxy-3β-hydroxy-6α-methylpregn-4-en-20-one.
5. 3β,17α-diacetoxy-6α-methylpregn-4-en-20-one.
6. 17α-acetoxy-3β-hydroxy-6-methylpregna-4,6-dien-20-one.
7. 3β,17α-diacetoxy-6-methylpregna-4,6-dien-20-one.

References Cited in the file of this patent

UNITED STATES PATENTS 2,891,079    Dodson et al. _____ June 16, 1959

FOREIGN PATENTS 849,072    Great Britain _____ Sept. 21, 1960
854,408    Great Britain _____ Nov. 16, 1960

OTHER REFERENCES

Selye: Textbook of Endrocrinology, acta, Endrocrinologica, Universite De Montreal, Montreal, Canada (1947), pp.–914 (page 71 depended upon).

Babcock et al.: J.A.C.S. 80, 2904–5 (June 5, 1958).